(12) United States Patent
Kang et al.

(10) Patent No.: US 8,849,023 B2
(45) Date of Patent: Sep. 30, 2014

(54) APPARATUS AND METHOD OF COMPENSATING CHROMATIC ABERRATION OF IMAGE

(75) Inventors: Joo-young Kang, Suwon-si (KR);
Hyun-wook Ok, Seoul (KR);
Seong-deok Lee, Suwon-si (KR);
Hyun-hwa Oh, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1573 days.

(21) Appl. No.: 11/907,126

(22) Filed: Oct. 9, 2007

(65) Prior Publication Data
US 2008/0170248 A1 Jul. 17, 2008

(30) Foreign Application Priority Data

Jan. 17, 2007 (KR) .................. 10-2007-0005356

(51) Int. Cl.
*G06K 9/00* (2006.01)
*G06K 9/40* (2006.01)
*G06K 9/46* (2006.01)
*G06K 9/66* (2006.01)
*H04N 9/64* (2006.01)
*G04F 3/08* (2006.01)
*H04N 9/04* (2006.01)

(52) U.S. Cl.
CPC ............... *H04N 9/045* (2013.01); *H04N 9/646* (2013.01)
USPC ........... 382/167; 382/195; 382/275; 348/248; 358/518

(58) Field of Classification Search
USPC ............. 382/162, 167, 181, 190, 195, 199, 382/254–255, 260–261, 266, 274–275; 348/228.1, 229.1, 234–235, 241, 243, 348/252–255, 362, 612, 627, 625
See application file for complete search history.

(56) References Cited

U.S. PATENT DOCUMENTS 6,343,146 B1 * 1/2002 Tsuruoka et al. ............. 382/163
6,747,757 B1 6/2004 Enomoto
(Continued)

FOREIGN PATENT DOCUMENTS

JP 6-327622 11/1994
JP 2000-92335 3/2000
(Continued)

OTHER PUBLICATIONS

John Mallon, Paul F. Whelan, Calibration and removal of lateral chromatic aberration in images, Pattern Recognition Letters, vol. 28, Issue 1, Jan. 1, 2007, pp. 125-135, ISSN 0167-8655, DOI: 10.1016/j.patrec.2006.06.013. (http://www.sciencedirect.com/science/article/pii/S0167865506001772).*

(Continued)

*Primary Examiner* — Randolph I Chu
*Assistant Examiner* — Nathan Bloom
(74) *Attorney, Agent, or Firm* — Staas & Halsey LLP

(57) ABSTRACT

The present invention relates to an apparatus and method of correcting a chromatic aberration of an image, and in particular, to an apparatus and method of correcting a chromatic aberration of an image that can correct a general chromatic aberration of an edge or an extreme chromatic aberration, such as a purple fringe, in an image.

An apparatus for correcting a chromatic aberration of an image according to an embodiment of the present invention includes an edge detection unit detecting an edge of an input image, a level calculation unit calculating a chromatic aberration level of the detected edge, and a correction unit correcting the edge using different weighted values according to the calculated chromatic aberration level.

11 Claims, 7 Drawing Sheets

(56) References Cited

U.S. PATENT DOCUMENTS

| | | | |
|---|---|---|---|
| 6,970,268 B1* | 11/2005 | Shin et al. | 358/1.9 |
| 2001/0030697 A1* | 10/2001 | Dischert et al. | 348/263 |
| 2003/0072044 A1* | 4/2003 | Hashiguchi et al. | 358/520 |
| 2004/0052414 A1* | 3/2004 | Schroder | 382/167 |
| 2004/0085459 A1* | 5/2004 | Hoshuyama et al. | 348/223.1 |
| 2006/0023943 A1* | 2/2006 | Makino | 382/167 |
| 2006/0093234 A1* | 5/2006 | Silverstein | 382/255 |
| 2006/0232681 A1* | 10/2006 | Okada | 348/222.1 |
| 2006/0251322 A1* | 11/2006 | Palum et al. | 382/167 |
| 2007/0097267 A1* | 5/2007 | Sakurai et al. | 348/571 |
| 2007/0103744 A1* | 5/2007 | Chiba | 358/518 |
| 2007/0229684 A1* | 10/2007 | Lin | 348/273 |
| 2008/0062409 A1* | 3/2008 | Utsugi | 356/124 |
| 2008/0174678 A1* | 7/2008 | Solomon | 348/231.99 |

FOREIGN PATENT DOCUMENTS

| | | |
|---|---|---|
| JP | 2004-120487 | 4/2004 |
| KR | 2003-0089232 | 11/2003 |

OTHER PUBLICATIONS

Office Action dated Apr. 16, 2008 in corresponding Korean Patent Application No. 10-2007-0005356 (4 pages).

* cited by examiner

FIG. 3

R CHANNEL

| R1 | R2 | R3 |
|----|----|----|
| R4 | R5 | R6 |
| R7 | R8 | R9 |

G CHANNEL

| G1 | G2 | G3 |
|----|----|----|
| G4 | G5 | G6 |
| G7 | G8 | G8 |

B CHANNEL

| B1 | B2 | B3 |
|----|----|----|
| B4 | B5 | B6 |
| B7 | B8 | B9 |

FIG. 4

| Y1 | Y2 | Y3 |
|----|----|----|
| Y4 | Y5 | Y6 |
| Y7 | Y8 | Y9 |

FIG. 5

| L1 | L2 | L3 |
|----|----|----|
| L4 | 0  | L6 |
| L7 | L8 | L9 |

APPARATUS AND METHOD OF COMPENSATING CHROMATIC ABERRATION OF IMAGE

CROSS REFERENCE TO RELATED APPLICATION

This application claims priority from Korean Patent Application No. 10-2007-0005356 filed on Jan. 17, 2007 in the Korean Intellectual Property Office, the disclosure of which is incorporated herein by reference in its entirety.

BACKGROUND OF THE INVENTION

1. Field of the Invention

The present invention relates to an apparatus and method of correcting a chromatic aberration of an image, and in particular, to an apparatus and method of correcting a chromatic aberration of an image that can correct a general chromatic aberration of an edge or an extreme chromatic aberration, such as a purple fringe, in an image.

2. Description of the Related Art

In general, an image, which is obtained by photographing a predetermined subject using a camera, deteriorates due to a lens aberration. This chromatic aberration is a phenomenon that a spurious color occurs in the image since a refractive index of light with respect to a material used for a lens varies according to the wavelength.

The chromatic aberration is broadly divided into LCA (Longitudinal Chromatic Aberration), TCA (Transverse Chromatic Aberration), and purple fringe. The LCA means an axial chromatic aberration in which a color spreads since the focus position on the optical axis varies according to the wavelength. The TCA is a phenomenon that light is obliquely incident with respect to the optical axis and different images are formed around the optical axis. The purple fringe is a phenomenon that, in a case of a high-magnification lens and a cheap and inferior lens, high color saturation is exhibited around an edge, at which a difference in brightness unexpectedly occurs in the image of the camera, and the edge is formed over a wide area.

As a technology for reducing the chromatic aberration, there is suggested a method that uses a lens having glass formed of a special material or processes a lens by a special treatment. However, when the lens is specially processed and manufactured, costs for the lens increase, and thus it is not widely used excluding a high-performance camera.

Korean Unexamined Patent Publication No. 2003-0089232 discloses an apparatus and method of correcting a chromatic aberration that can correct a chromatic aberration within a predetermined pixel range using a chromatic aberration algorithm using a circuit. However, there has not been suggested a method that corrects a chromatic aberration including an extreme chromatic aberration as well as a general chromatic aberration.

SUMMARY OF THE INVENTION

An object of the present invention to provide an apparatus and method of correcting a chromatic aberration of an image that can correct a chromatic aberration of an image, including an extreme chromatic aberration, such as purple fringe, as well as a general chromatic aberration to be generated at an edge in an image captured by a camera, without using a separately processed or manufactured lens.

Objects of the present invention are not limited to those mentioned above, and other objects of the present invention will be apparently understood by those skilled in the art through the following description.

According to a first aspect of the present invention, there is provided an apparatus for correcting a chromatic aberration of an image, the apparatus including an edge detection unit detecting an edge of an input image, a level calculation unit calculating a chromatic aberration level of the detected edge, and a correction unit correcting the edge using different weighted values according to the calculated chromatic aberration level.

According to a second aspect of the present invention, there is provided an apparatus for correcting a chromatic aberration of an image, the apparatus including an edge detection unit detecting an edge of an input image, a color detection unit detecting a color of a center pixel in a predetermined region of the detected edge, and a correction unit correcting the edge according to the detected color and colors of peripheral pixels of the center pixel.

According to a third aspect of the present invention, there is provided a method of correcting a chromatic aberration of an image, the method including detecting an edge of an input image, calculating a chromatic aberration level of the detected edge, and correcting the edge using different weighted values according to the calculated chromatic aberration level.

According to a fourth aspect of the present invention, there is provided a method of correcting a chromatic aberration of an image, the method including detecting an edge of an input image, detecting a color of a center pixel in a predetermined region of the detected edge, and correcting the edge according to the detected color and colors of peripheral pixels of the center pixel.

BRIEF DESCRIPTION OF THE DRAWINGS

The above and other features and advantages of the present invention will become more apparent by describing in detail preferred embodiments thereof with reference to the attached drawings in which:

FIG. 3 is a schematic view showing individual color channels at the edge according to the embodiment of the present invention;

FIG. 4 is a schematic view showing luminance of individual pixels at the edge according to the embodiment of the present invention;

FIG. 5 is a schematic view showing a difference in luminance of a center pixel and peripheral pixels according to the embodiment of the present invention;

DESCRIPTION OF THE PREFERRED EMBODIMENTS

Figure 1:
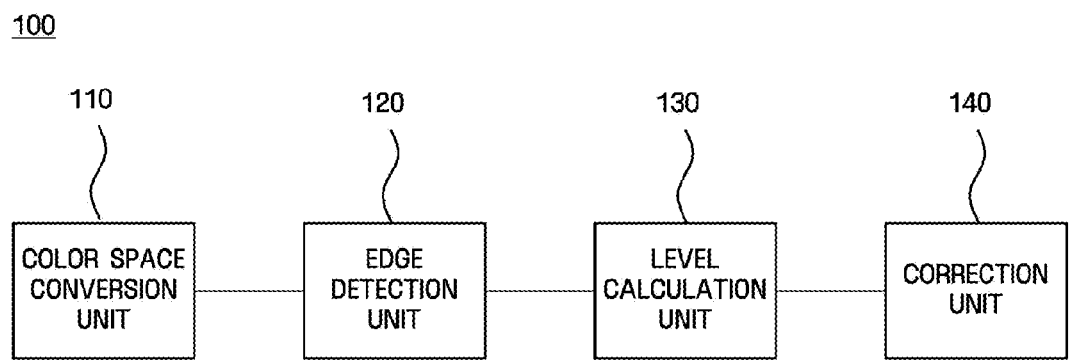
FIG. 1 is a block diagram showing an apparatus for correcting a chromatic aberration of an image according to a first embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the present invention to those skilled in the art, and the present invention will only be defined by the appended claims. Like reference numerals refer to like elements throughout the specification.

The present invention will be described hereinafter with reference to block diagrams or flowchart illustrations of a method and an apparatus for securely updating and booting a code image according to an exemplary embodiment thereof. It will be understood that each block of the flowchart illustrations, and combinations of blocks in the flowchart illustrations can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the block diagrams may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

FIG. 1 is a block diagram showing an apparatus for correcting a chromatic aberration of an image according to a first embodiment of the present invention.

As shown in FIG. 1, an apparatus 100 for correcting a chromatic aberration of an image according to the first embodiment of the present invention includes a color space conversion unit 110 that converts a color space of an input image, an edge detection unit 120 that detects an edge of the input image, a level calculation unit 130 that calculates a chromatic aberration level of the detected edge, and a correction unit 140 that corrects the edge according to the calculated chromatic aberration level.

After the color space of the input image is converted by the color space conversion unit 110, the edge detection unit 120 detects the edge. That is, the input image may have an RGB color space, and the color space conversion unit 110 may convert the RGB color space into a YCbCr color space. At this time, the edge detection unit 120 can detect the edge of the input image on the basis of a difference in brightness around the edge of the input image that is converted into the YCbCr color space.

The level calculation unit 130 can calculate the level of the chromatic aberration at the edge detected by the edge detection unit 120. The calculation of the chromatic aberration can be performed by a variation of each color channel between pixels at the detected edge. At this time, in the embodiment of the present invention, an example where color channels include an R channel, a G channel, and a B channel will be described, but the present invention is not limited thereto. For example, color channels that are used to calculate the chromatic aberration level in the embodiment of the present invention can be changed according to the color space of the input image.

Figure 2:
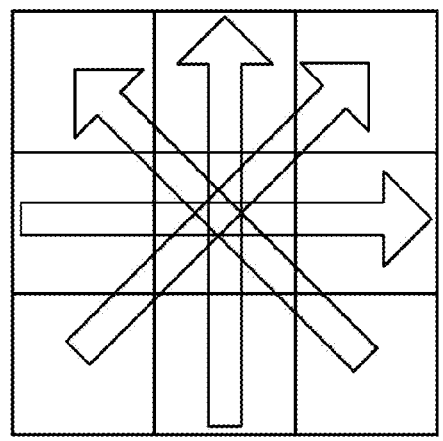
FIG. 2 is a schematic view showing a direction of calculating a variation of each color channel at an edge according to the embodiment of the present invention.

The level calculation unit 130 calculates a variation of each color channel in an n×m region of the detected edge in a predetermined direction. For example, when the level calculation unit 130 calculates the level of the chromatic aberration level in a 3×3 region, as shown in FIG. 2, a variation of each color channel between pixels can be calculated in the 3×3 region in a horizontal direction, a vertical direction, and a diagonal direction. Of course, in the embodiment of the present invention, a case where the variation of each color channel between the pixels is calculated in the horizontal direction, the vertical direction, and the diagonal direction has been described. However, this is just an example for better understanding of the present invention but not intended to limit the present invention.

Specifically, as shown in FIG. 3, the level calculation unit 130 has the R channel, the G channel, and the B channel in the 3×3 region, the variation of each color channel between the pixels in the horizontal direction is represented by Equation 1.

$$G_{red\_Hor1}=|R4-R5|, G_{green\_Hor1}=|G4-G5|,$$
$$G_{blue\_Hor1}=|B4-B5|,$$

$$G_{red\_Hor2}=|R5-R6|, G_{green\_Hor2}=|G5-G6|,$$
$$G_{blue\_Hor2}=|B5-B6| \quad \text{[Equation 1]}$$

At this time, although Equation 1 represents a case where the variation of each color channel in the horizontal direction is calculated, but as for the vertical direction and the diagonal direction, similarly to Equation 1, the variation of each color channel can be calculated. Further, in Equation 1, it can be understood that the term 'red' in $G_{red\_Hor1}$ represents the corresponding color channel, and Hor1 represents a direction for calculating the variation.

At this time, the level calculation unit 130 can calculate the chromatic aberration level of the detected edge by a difference between the variation of the G channel and the variation of the R channel or the B channel. That is, when no edge exists, the variation of the G channel and the variation of the R channel or the B channel are the same. Meanwhile, as the edge becomes larger, the difference between the variation of the G channel and the variation of the R channel or the B channel becomes larger.

Further, the difference between the variation of the G channel and the variation of the R channel or the B channel can be calculated by Equation 2. At this time, in Equation 2, like Equation 1, a case where the difference in the horizontal direction is calculated has been described, but as for the vertical direction and the diagonal direction, the difference can be similarly calculated.

$$\text{Difference } 1 = |G_{green\_Hor1} - G_{red\_Hor1}|, \text{Difference } 2 = |G_{green\_Hor1} - G_{red\_Hor2}|$$

$$\text{Difference } 3 = |G_{green\_Hor1} - G_{blue\_Hor1}|, \text{Difference } 4 = |G_{green\_Hor2} - G_{blue\_Hor2}| \qquad \text{[Equation 2]}$$

At this time, in Equation 2, the differences 1 and 2 represent the variation of the G channel and the variation of the R channel, and the differences 3 and 4 represent the variation of the G channel and the variation of the B channel.

The correction unit 140 compares the chromatic aberration level calculated by the level calculation unit 130 and a reference value, and corrects the detected edge using different weighted values. At this time, when the calculated chromatic aberration level is smaller than the reference value, the correction unit 140 can judge that the edge is small. Meanwhile, when the calculated chromatic aberration level becomes larger than the reference value, the correction unit 140 can judge that the edge is large.

At this time, the correction unit 140 calculates a difference in luminance between a center pixel and a peripheral pixel in the n×m region of the edge, and corrects the edge using a weighted value according to the calculated difference in luminance. Further, in the embodiment of the present invention, a case where the correction unit 140 uses a first weighted value when the calculated chromatic aberration level is smaller than the reference value and uses a second weighted value when the calculated chromatic aberration level is not smaller than the reference value will be described.

For example, as shown in FIG. 4, when the correction unit 140 calculates the difference in luminance between the center pixel and the peripheral pixel in the 3×3 region, the difference in luminance between the center pixel and the peripheral pixel is represented by Equation 3.

$$L1 = |Y5 - Y1|, L2 = |Y5 - Y2|, L3 = |Y5 - Y3|, L4 = |Y5 - Y4|, L5 = |Y5 - Y5|,$$

$$L6 = |Y5 - Y6|, L7 = |Y5 - Y7|, L8 = |Y5 - Y8|, L9 = |Y5 - Y9| \qquad \text{[Equation 3]}$$

At this time, in Equation 3, L represents the difference in luminance, and as for the center pixel, since the difference is calculated by subtracting the center pixel from itself, $L5 = |Y5 - Y5|$, that is, zero (0).

As such, as shown in FIG. 5, after the difference in luminance between the center pixel and the peripheral pixel is calculated using Equation 3, the edge can be corrected using the first weighted value and the second weighted value according to the calculated chromatic aberration level.

Figure 6:
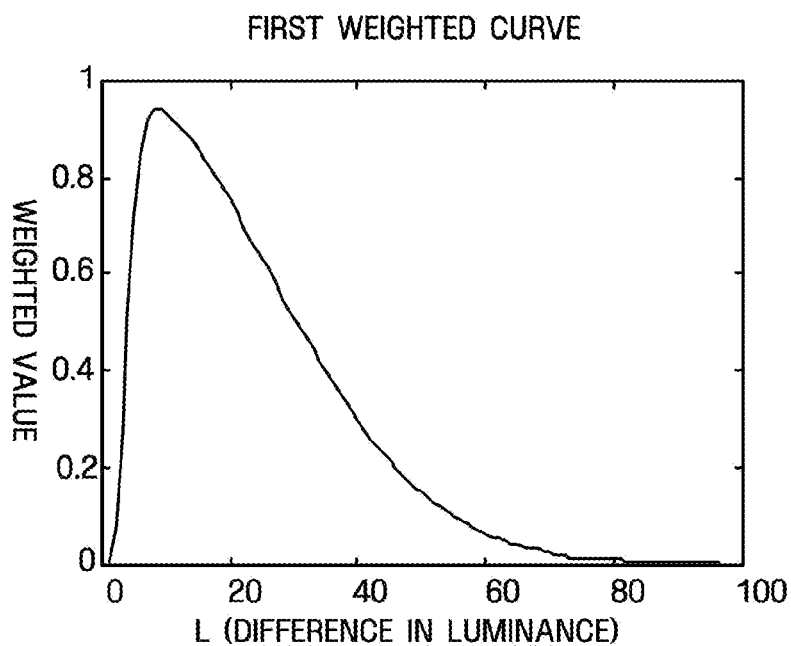
FIG. 6 is a graph showing a weighted curve of a first weighted value according to the embodiment of the present invention.
Figure 7:
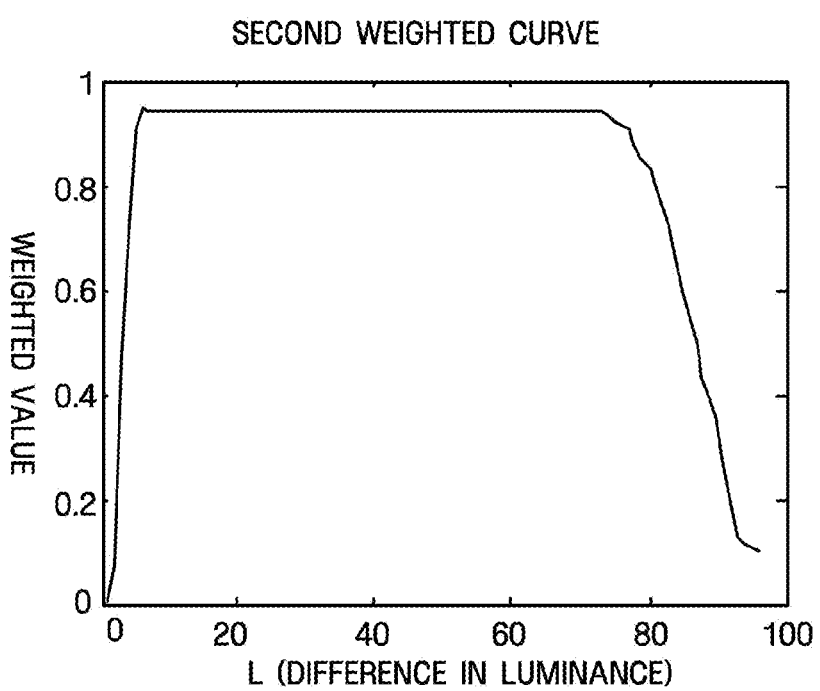
FIG. 7 is a graph showing a weighted curve of a second weighted value according to the embodiment of the present invention.

At this time, as shown in FIGS. 6 and 7, the first weighted value and the second weighted value have different weighted value curves. This is because, when the chromatic aberration level is smaller than the reference value, the edge is small and thus a small number of periods, to which a large weighted value is applied, exist, and, when the chromatic aberration level is larger than the reference value, the edge is large and thus a large number of periods, to which a large weighted value is applied, exist.

Figure 8:
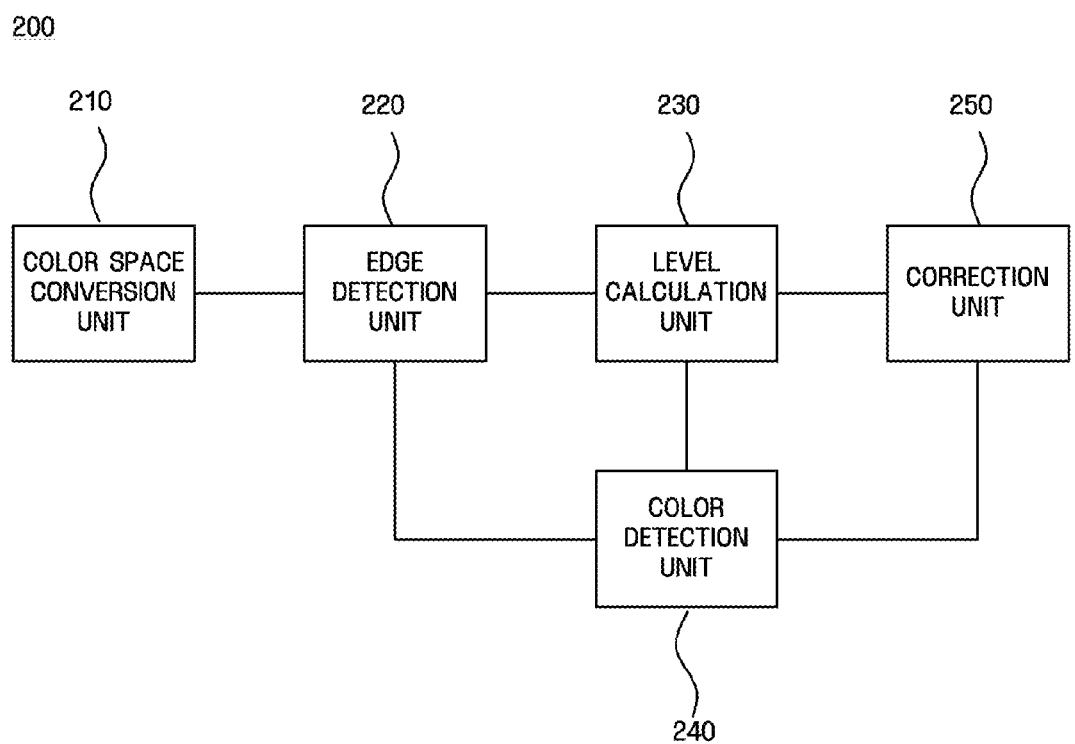
FIG. 8 is a block diagram showing an apparatus for correcting a chromatic aberration of an image according to a second embodiment of the present invention.

FIG. 8 is a block diagram showing an apparatus for correcting a chromatic aberration of an image according to a second embodiment of the present invention.

As shown in FIG. 8, an apparatus 200 for correcting a chromatic aberration of an image according to the second embodiment of the present invention includes a color space conversion unit 210 that converts a color space of an input image, an edge detection unit 220 that detects an edge of the input image, a level calculation unit 230 that calculates a chromatic aberration level of the detected edge, a color detection unit 240 that detects a color of the detected edge, and a correction unit 250 that calculates the edge according to the calculated chromatic aberration level and the detected color.

After the color space of the input image is converted by the color space conversion unit 210, the edge detection unit 220 detects the edge. That is, the input image may have an RGB color space, and the color space conversion unit 110 may convert the RGB color space into a YCbCr color space. At this time, the edge detection unit 220 can detect the edge on the basis of a difference in brightness at the edge of the input image that is converted into the YCbCr color space.

The level calculation unit 230 calculates a variation of each color channel in a predetermined direction in the n×m region of the detected edge. At this time, the level calculation unit 230 according to the second embodiment of the present invention performs the same function as the level calculation unit 130 according to the first embodiment of the present invention, and thus the detailed description thereof will be omitted.

The color detection unit 240 detects the color of the detected edge. At this time, the color detection unit 240 can detect Cb and Cr of the center pixel in the n×m region. This is possible because the color space conversion unit 210 converts the color space of the input image from RGB to YCbCr.

The correction unit 250 corrects the edge according to the color detected by the color detection unit 240 and the calculated chromatic aberration level. That is, when the calculated chromatic aberration level is smaller than the reference value, the correction unit 250 performs the same correction as the correction unit 140 according to the first embodiment of the present invention. Meanwhile, when the calculated chromatic aberration level is larger than the reference value, in addition to the same correction as the correction unit 140 according to the first embodiment of the present invention, the edge can be corrected using Cb and Cr of the center pixel in the n×m region of the edge detected by the color detection unit 240.

That is, it can be understood that the first embodiment of the present invention corrects an edge that occurs when light is obliquely incident on a lens with respect to the optical axis and different images are formed around the optical axis, while the second embodiment of the present invention corrects the purple fringe that, when a high-magnification lens or a cheap and inferior lens is used, a difference in brightness of the image unexpectedly occurs, and high color saturation is exhibited around the edge.

Figure 9:
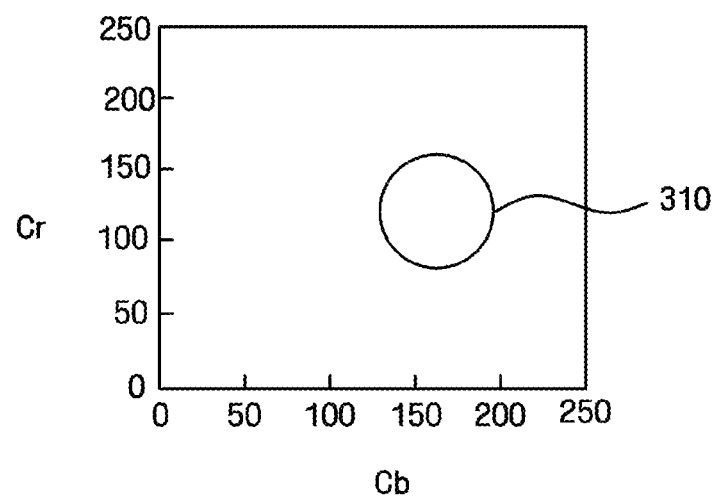
FIG. 9 is a graph showing a purple fringe region according to the embodiment of the present invention.

Accordingly, the correction unit 250 judges whether or not the color of the center pixel of the edge is included in a predetermined color region 310, that is, a purple fringe region, as shown in FIG. 9. As the judgment result, when the color of the center pixel of the edge is included in the purple fringe region, and a high-brightness pixel exists around the center pixel, it can be judged that the purple fringe occurs. Since the purple fringe occurs in a portion other than the edge, it can be understood that the second embodiment of the present invention corrects the purple fringe.

If it is judged that the center pixel is included in the purple fringe region in the n×m region of the edge, the correction unit 250 judges whether or not a peripheral pixel is included in the purple fringe region. As the judgment result, when the peripheral pixel is not included in the purple fringe region, and the peripheral pixel is not the high-brightness pixel, the correction unit 250 corrects the edge with 1 as the weighted value relative to the color of the corresponding pixel. At this time, in the second embodiment of the present invention, the weighted value has a value between 0 and 1.

For example, when the input image includes the sky and a tree, if the purple fringe occurs, the correction unit 250 should correct the edge using the color of the tree, not the color of the sky. Accordingly, when the peripheral pixel is not included in the purple fringe region, and the peripheral pixel is not the high-brightness pixel, that is, in a case of the color of the tree, the weighted value relative to the color of the corresponding pixel is set to 1 or a value close to 1, thereby correcting the edge.

Figure 10:
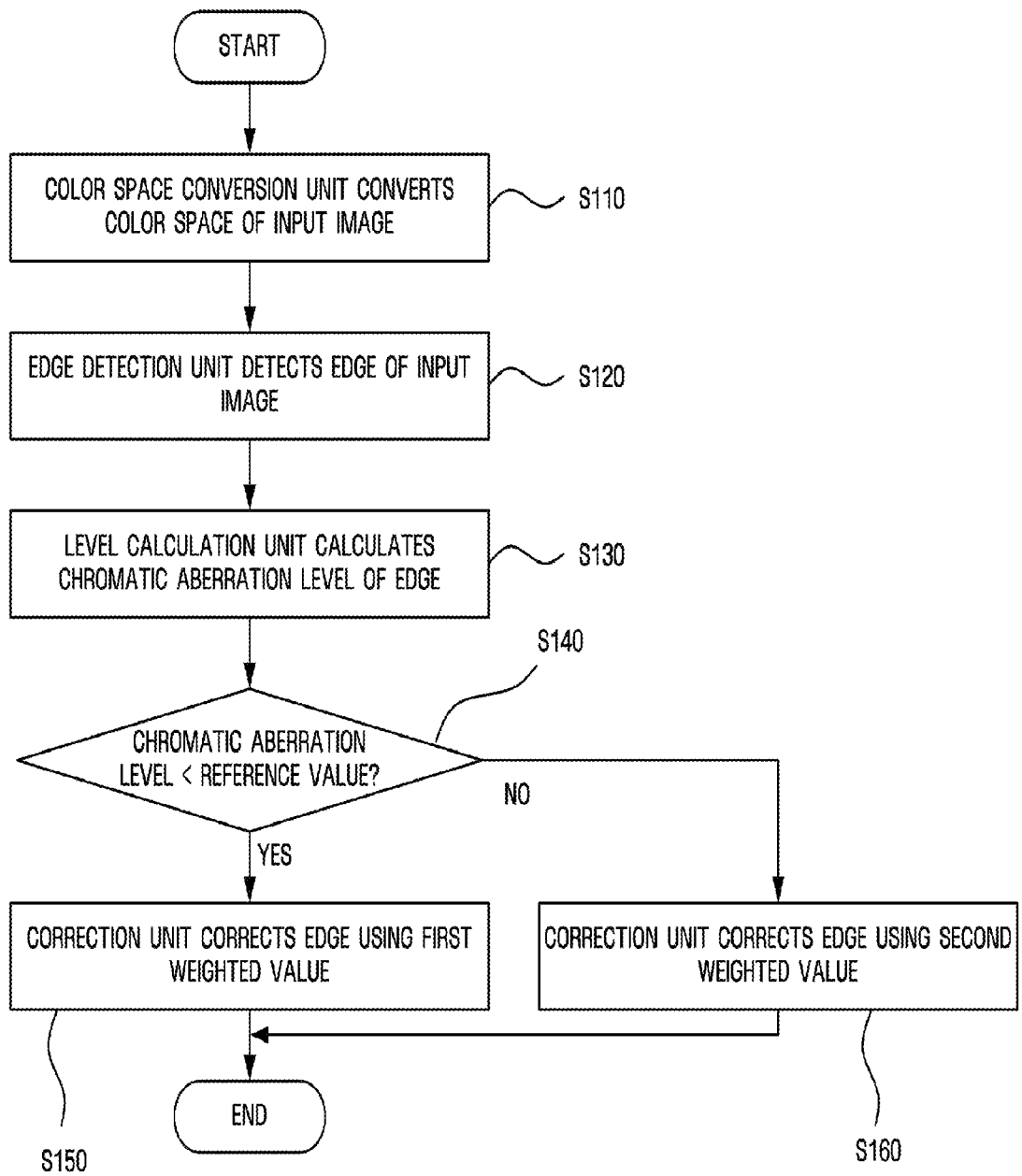
FIG. 10 is a flowchart showing a method of correcting a chromatic aberration of an image according to the first embodiment of the present invention.

FIG. 10 is a flowchart showing a method of correcting a chromatic aberration of an image according to the first embodiment of the present invention. At this time, FIG. 10 can be understood as the operation of the apparatus shown in FIG. 1.

As shown in FIG. 10, in the method of correcting a chromatic aberration of an image according to the first embodiment of the present invention, first, the color space conversion unit 110 converts the color space of the input image from RGB to YCbCr (Step S110).

After the color space of the input image is converted by the color space conversion unit 110, the edge detection unit 120 detects the edge of the input image (Step S120).

The level calculation unit 130 calculates the chromatic aberration level of the detected edge (Step S130). At this time, the level calculation unit 130 calculates the variations of the individual color channels between the pixels in the predetermined direction in the n×m region of the edge according to Equation 1, and calculates the difference between the variation of the G channel and the variation of the R channel or the G channel according to Equation 2, thereby calculating the chromatic aberration level.

The correction unit 140 compares the chromatic aberration level calculated by the level calculation unit 130 and the reference value (Step S140). As the comparison result, when the chromatic aberration level is smaller than the reference value, the correction unit 140 corrects the edge using the first weighted value (Step S150). Meanwhile, as the comparison result, when the chromatic aberration level is larger than the reference value, the correction unit 140 corrects the edge using the second weighted value (Step S160).

At this time, as shown in FIGS. 6 and 7, as regards the first weighted value and the second weighted value, the first weighted value has a small number of periods, to which a relatively larger weighted value is applied, compared with the second weighted value. This is because it can be understood that, when the first weighted value is used, the edge is small.

Figure 11:
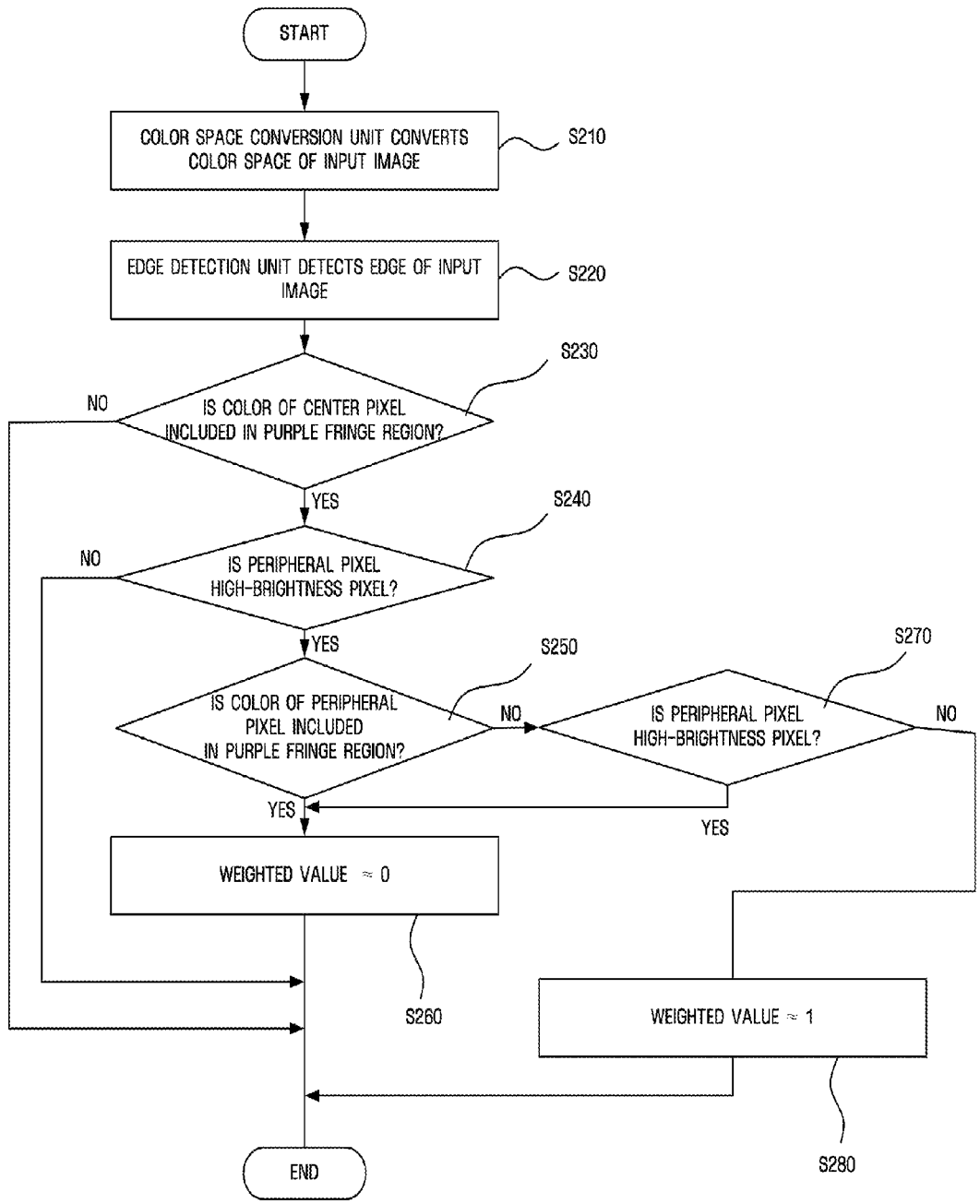
FIG. 11 is a flowchart showing a method of correcting a chromatic aberration of an image according to the second embodiment of the present invention.

FIG. 11 is a flowchart showing a method of correcting a chromatic aberration of an image according to the second embodiment of the present invention. At this time, FIG. 11 can be understood as the operation of the apparatus shown in FIG. 8.

As shown in FIG. 11, in the method of correcting a chromatic aberration of an image according to the second embodiment of the present invention, first, the color space conversion unit 210 converts the color space of the input image from RGB to YCbCr (Step S210).

After the color space of the input image is converted by the color space conversion unit 210, the edge detection unit 220 detects the edge of the input image (Step S220).

The color detection unit 240 judges whether or not Cb and Cr of the center pixel are included in the predetermined color region, that is, the purple fringe region, of the n×m region of the detected edge (Step S230).

Thereafter, the color detection unit 240 judges whether or not the peripheral pixel of the center pixel is the high-brightness pixel (Step S240). At this time, the reason why the color detection unit 240 detects whether or not the peripheral pixel is the high-brightness pixel is that an unexpected difference in brightness occurs due to the occurrence characteristic of the purple fringe.

If it is judged that the purple fringe occurs in the edge through Steps S230 and S240, the correction unit 250 judges whether or not the color of the peripheral pixel is included in the purple fringe region (Step S260). As the judgment result, when the color of the peripheral pixel is included in the purple fringe region, the weighted value relative to the color of the corresponding peripheral pixel is set to 0 or a value close to 0. This is to prevent the pixel, at which the purple fringe occurs, from being corrected to a pixel, at which the purple fringe occurs.

In addition, when the peripheral pixel is not included in the purple fringe region, the correction unit 250 judges whether or not the peripheral pixel is the high-brightness pixel (Step S270). As the judgment result, when it is judged that the peripheral pixel is not the high-brightness pixel, the weighted value relative to the color of the corresponding pixel is set to 1 or a value close to 1, thereby correcting the edge (Step S280).

As the judgment result of Step S270, when it is judged that the peripheral pixel is not the high-brightness pixel, the weighted value relative to the color of the corresponding peripheral pixel is set to 0 or a value close to 0. Accordingly, in an image having the sky as a background and a tree as an object, the edge where the purple fringe occurs is corrected to the color of the tree, not the color corresponding to the sky.

Meanwhile, in the embodiments of the present invention, there have been described a case where the edge is corrected using different weighted values according to the chromatic aberration level, as shown in FIG. 1, and a case where the edge is corrected according to the color detection of the edge, as shown in FIG. 8. However, the present invention is not limited thereto. For example, the apparatuses of FIGS. 1 and 8 can be integrated, and some of the components may be integrated and the others may be separately provided.

The term 'unit', as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and modules or further separated into additional components and modules.

As described above, the apparatus and method of correcting a chromatic aberration of an image according to the present invention has been described with reference to the accompanying drawings, but the present invention is not limited to the embodiments described herein and the drawings. Various modifications can be made by those skilled in the art within the technical scope of the present invention.

According to the apparatus and method of correcting a chromatic aberration of an image of the present invention, the following effects can be obtained.

The general chromatic aberration due to the lens can be corrected using different weighted values according to the chromatic aberration level. Therefore, upon the correction, a wide chromatic aberration can be corrected.

In addition, the wide chromatic aberration or the purple fringe having high color saturation that occurs around the edge, at which the difference in brightness unexpectedly appears can be corrected.

What is claimed is:

1. An apparatus for correcting a chromatic aberration of an image, the apparatus comprising:
    a processor comprising:
    an edge detection unit detecting an edge of an input image;
    a level calculation unit calculating a chromatic aberration level of the detected edge; and
    a correction unit correcting the edge using different weighted values according to the calculated chromatic aberration level,
    wherein the level calculation unit calculates variations of individual color channels between adjacent pixels in a predetermined direction in an n×m region of the detected edge, and calculates the chromatic aberration level by a difference between variations of the color channels.

2. The apparatus of claim 1, wherein the level calculation unit calculates the chromatic aberration level by a difference between a variation of a G channel and a variation of at least one of an R channel and a B channel.

3. The apparatus of claim 2, wherein the correction unit compares the difference and a predetermined reference value, and corrects the edge according to a first weighted value and a second weighted value based on the comparison result.

4. The apparatus of claim 3, wherein the first weighted value and the second weighted value have a curve that represents a weighted value corresponding to a difference in luminance between a center pixel and a peripheral pixel in the n×m region.

5. The apparatus of claim 4, further comprising:
    a color space conversion unit converting an RGB color space of the input image into a YCbCr color space.

6. A method of correcting a chromatic aberration of an image, the method comprising:
    detecting an edge of an input image;
    calculating, by a processor, a chromatic aberration level of the detected edge; and
    correcting the edge using different weighted values according to the calculated chromatic aberration level,
    wherein the calculating of the chromatic aberration level comprises
    calculating variation of individual color channels between adjacent pixels in a predetermined direction in an n×m region of the detected edge, and
    calculating the chromatic aberration level by a difference between variations of the color channels.

7. The method of claim 6, wherein the calculating of the chromatic aberration level comprises calculating the chromatic aberration level by a difference between a variation of a G channel and a variation of at least one of an R channel and a B channel.

8. The method of claim 7, wherein the correcting of the edge comprises:
    comparing the difference and a predetermined reference value; and
    correcting the edge according to a first weighted value and a second weighted value based on the comparison result.

9. The method of claim 8, wherein the first weighted value and the second weighted value have a curve that represents a weighted value corresponding to a difference in luminance between a center pixel and a peripheral pixel in the n×m region.

10. The method of claim 9, further comprising:
    converting an RGB color space of the input image into a YCbCr color space.

11. An apparatus for correcting a chromatic aberration of an image, the apparatus comprising:
    a processor comprising:
    an edge detection unit detecting an edge of an input image;
    a level calculation unit calculating a chromatic aberration level of the detected edge; and
    a correction unit correcting the edge using different weighted values according to the calculated chromatic aberration level,
    wherein the level calculation unit calculates variations of individual color channels between adjacent pixels in a predetermined direction in an n×m region of the detected edge, and calculates the chromatic aberration level by a difference between variations of the color channels, and
    wherein the correction unit uses a first weighted value when the calculated chromatic aberration level is smaller than a reference value, and uses a second weighted value when the calculated chromatic aberration level is greater than or equal to the reference value.

* * * * *